(12) United States Patent
De Souza Pires (10) Patent No.: US 11,746,935 B2
(45) Date of Patent: Sep. 5, 2023

(54) FLEXIBLE PIPE BODY AND METHOD (71) Applicant: BAKER HUGHES ENERGY TECHNOLOGY UK LIMITED, Bristol (GB)

(72) Inventor: Fabio De Souza Pires, Newcastle Upon Tyne (GB)

(73) Assignee: Baker Hughes Energy Technology UK Limited, Bristol (GB)

( * ) Notice: Subject to any disclaimer, the term of this patent is extended or adjusted under 35 U.S.C. 154(b) by 417 days.

(21) Appl. No.: 17/043,278

(22) PCT Filed: Feb. 20, 2019

(86) PCT No.: PCT/GB2019/050464
§ 371 (c)(1),
(2) Date: Sep. 29, 2020

(87) PCT Pub. No.: WO2019/186099
PCT Pub. Date: Oct. 3, 2019

(65) Prior Publication Data
US 2021/0048123 A1 Feb. 18, 2021

(30) Foreign Application Priority Data
Mar. 29, 2018 (GB) ...................................... 1805262

(51) Int. Cl.
*F16L 11/08* (2006.01)
*F16L 57/06* (2006.01)
(Continued)

(52) U.S. Cl.
CPC ............. *F16L 11/088* (2013.01); *F16L 57/06* (2013.01); *G01M 3/165* (2013.01); *G01M 3/18* (2013.01)

(58) Field of Classification Search
CPC .. F16L 11/12; F16L 11/02; F16L 57/00; F16L 57/04; F16L 11/083
(Continued)

(56) References Cited

U.S. PATENT DOCUMENTS

| 4,867,205 A | 9/1989 | Bournazel et al. |
| 5,647,400 A * | 7/1997 | Jani ........................ F16L 11/081 138/172 |

(Continued)

FOREIGN PATENT DOCUMENTS

| CN | 102272504 A | 12/2011 |
| CN | 103299116 A | 9/2013 |

(Continued)

OTHER PUBLICATIONS

Search Report and Written Opinion from Application No. PCT/GB2019/050464 dated Apr. 12, 2019 (17 pages).
(Continued)

*Primary Examiner* — Patrick F Brinson
(74) *Attorney, Agent, or Firm* — Troutman Pepper Hamilton Sanders LLP; Ryan A. Schneider; Korbin M. Blunck (57) ABSTRACT

A flexible pipe body for a flexible pipe for transporting production fluid from a sub-sea location. The flexible pipe body includes an inner sheath layer for retaining fluid within a bore of the flexible pipe body and an outer sheath layer provided radially outwardly of the inner sheath layer. An abrasion layer is provided radially outwardly of the outer sheath layer for protecting the outer sheath layer against abrasion damage. A reinforcement layer is provided between the outer sheath layer and the abrasion layer, for protecting the outer sheath layer against impact damage. The reinforcement layer includes filaments that are woven, braided, knitted or otherwise intertwined.

25 Claims, 6 Drawing Sheets

(51) Int. Cl.
*G01M 3/16* (2006.01)
*G01M 3/18* (2006.01)

(58) Field of Classification Search
USPC .............................. 138/123–126, 134, 135
See application file for complete search history.

(56) References Cited

U.S. PATENT DOCUMENTS

| | | | |
|---|---|---|---|
| 5,934,335 A | 8/1999 | Hardy | |
| 6,123,114 A | 9/2000 | Seguin | |
| 6,390,141 B1* | 5/2002 | Fisher | F16L 11/081 |
| | | | 138/125 |
| 8,539,985 B2* | 9/2013 | Weil | F16L 11/083 |
| | | | 138/125 |
| 2012/0125470 A1* | 5/2012 | Nanney | F16L 11/087 |
| | | | 138/125 |
| 2013/0312862 A1* | 11/2013 | Kalman | B32B 38/0012 |
| | | | 156/60 |
| 2015/0059904 A1 | 3/2015 | Nokkentved | |
| 2015/0275586 A1 | 10/2015 | Glejbol | |
| 2016/0069484 A1* | 3/2016 | Jha | B29C 35/02 |
| | | | 156/149 |
| 2022/0112362 A1* | 4/2022 | Anantha Narayana Iyer | |
| | | | F16L 11/08 |

FOREIGN PATENT DOCUMENTS

| | | |
|---|---|---|
| CN | 104141838 A | 11/2014 |
| CN | 204695853 U | 10/2015 |
| CN | 205350624 | 6/2016 |
| CN | 206054981 U | 3/2017 |
| CN | 107206714 A | 9/2017 |
| WO | 2012/082178 | 6/2012 |
| WO | 2015/144723 | 10/2015 |
| WO | 2015144723 A1 | 10/2015 |

OTHER PUBLICATIONS

Search Report from Application No. GB 1805262.1 dated Sep. 3, 2018 (3 pages).
Office Action from Application No. CN 201980022574.X dated Jul. 15, 2022.
Search Report from Application No. CN 201980022574.X dated Jan. 10, 2022 (11 pages).

* cited by examiner

FLEXIBLE PIPE BODY AND METHOD

The present invention relates to a flexible pipe body and method. In particular, but not exclusively, the present invention relates to a flexible pipe body with improved protection to impact, and a method of protecting a flexible pipe against impact.

Traditionally flexible pipe is utilised to transport production fluids, such as oil and/or gas and/or water, from one location to another. Flexible pipe is particularly useful in connecting a sub-sea location (which may be deep underwater) to a sea level location. The pipe may have an internal diameter of typically up to around 0.6 metres (e.g. diameters may range from 0.05 m up to 0.6 m). Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, and/or metallic, and/or composite layers. For example, a pipe body may include polymer and metal layers, or polymer and composite layers, or polymer, metal and composite layers.

API Recommended Practice 17B provides guidelines for the design, analysis, manufacture, testing, installation, and operation of flexible pipes and flexible pipe systems for onshore, subsea and marine applications.

API Specification 17J titled "Specification for Unbonded Flexible Pipe" defines the technical requirements for safe, dimensionally and functionally interchangeable flexible pipes that are designed and manufactured to uniform standards and criteria.

Unbonded flexible pipe has been used for deep water (less than 3,300 feet (1,005.84 metres)) and ultra deep water (greater than 3,300 feet) developments. It is the increasing demand for oil which is causing exploration to occur at greater and greater depths where environmental factors are more extreme. For example, in such deep and ultra-deep water environments ocean floor temperature increases the risk of production fluids cooling to a temperature that may lead to pipe blockage. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result, the need for high levels of performance from the layers of the flexible pipe body is increased.

In use, the flexible pipe may be located on or adjacent to a contact hazard, or a contact hazard may move into contact range with the flexible pipe. That is, the outer surface (which typically constitutes an outer sheath) of the flexible pipe may rub or knock against a nearby object. For example, the contact hazard may be a rocky seabed or a riser touchdown location or clash area or pipeline crossing zone or contact surface on a buoyancy element. Excessive contact with the contact hazard may result in the outer sheath of the flexible pipe being breached due to excessive abrasion and/or impact. Such a breach of the outer sheath may expose the annulus of the flexible pipe and the layers therein (e.g. tensile armour wires), potentially leading to contact between the underlying layers of the flexible pipe and the contact hazard. In addition, the breach may result in the annulus of the flexible pipe becoming flooded, which can also result in damage to the layers within the annulus.

It would be useful to have a flexible pipe, with improved resistance to being breached through contact with a contact hazard in comparison to known systems.

EP2746633 A1 discloses an apparatus and method for protecting an outer layer of a flexible pipe. The apparatus includes a protective sleeve body comprising a first end region and a further end region and at least one connector element which is securable to the first end region of the sleeve body for securing the sleeve body with respect to a flexible pipe located proximate to a wear hazard. U.S. Pat. No. 7,287,936 B2 discloses a shallow water riser extending between a seabed connection and a floating support connection. A protective sheath surrounds the riser at the contact regions with the seabed.

DK 201600396 discloses a vinylidene fluoride polymer outer sheath for unbonded flexible pipe. The outer sheath is wound layer of extruded and wound foil to form a holding layer for preventing buckling of an underlying tensile armour layer (i.e. an anti-birdcaging effect). The outer sheath may be reinforced with fibres or a row of fibres outside the sheath to increase holding strength. So, the fibres are aligned to give strength in one direction to help prevent birdcaging (which itself is known in the flexible pipe field as an issue).

EP1125079 discloses another arrangement for a flexible pipe.

According to a first aspect of the present invention there is provided a flexible pipe body for a flexible pipe for transporting production fluid from a sub-sea location, comprising:

an inner sheath layer for retaining fluid within a bore of the flexible pipe body;

an outer sheath layer provided radially outwardly of the inner sheath layer;

an abrasion layer provided radially outwardly of the outer sheath layer for protecting the outer sheath layer against abrasion damage; and a reinforcement layer provided between the outer sheath layer and the abrasion layer, for protecting the outer sheath layer against impact damage, wherein the reinforcement layer comprises a plurality of filaments that are woven, braided, knitted or otherwise intertwined.

According to a second aspect of the present invention there is provided a method of protecting a flexible pipe for transporting production fluid from a sub-sea location against outer sheath integrity breaching impact damage, comprising:

configuring the flexible pipe such that the flexible pipe body is the flexible pipe body according to the first aspect of the present invention.

Certain embodiments of the invention provide the advantage that a flexible pipe body is provided, which has improved resistance to abrasion and impact damage than known systems.

Certain embodiments of the invention provide the advantage that it is possible to provide a pipe body structure which is less stiff than would otherwise be the case (maintaining the key benefit of this type of pipe—it's flexibility). One reason this can be achieved is because the abrasion layer does not have to perform the dual function of providing abrasion resistance and impact resistance, and can therefore be reduced in thickness. The selection of materials for the two separate layers (abrasion layer and reinforcement layer) can also be optimised to provide a solution which provides both the best possible abrasion resistance and the best possible impact resistance.

Certain embodiments provide a flexible pipe body that has appropriate impact protection whilst being relatively light weight compared to known arrangements.

Embodiments of the invention are further described hereinafter with reference to the accompanying drawings, in which.

In the drawings like reference numerals refer to like parts.

Figure 1:
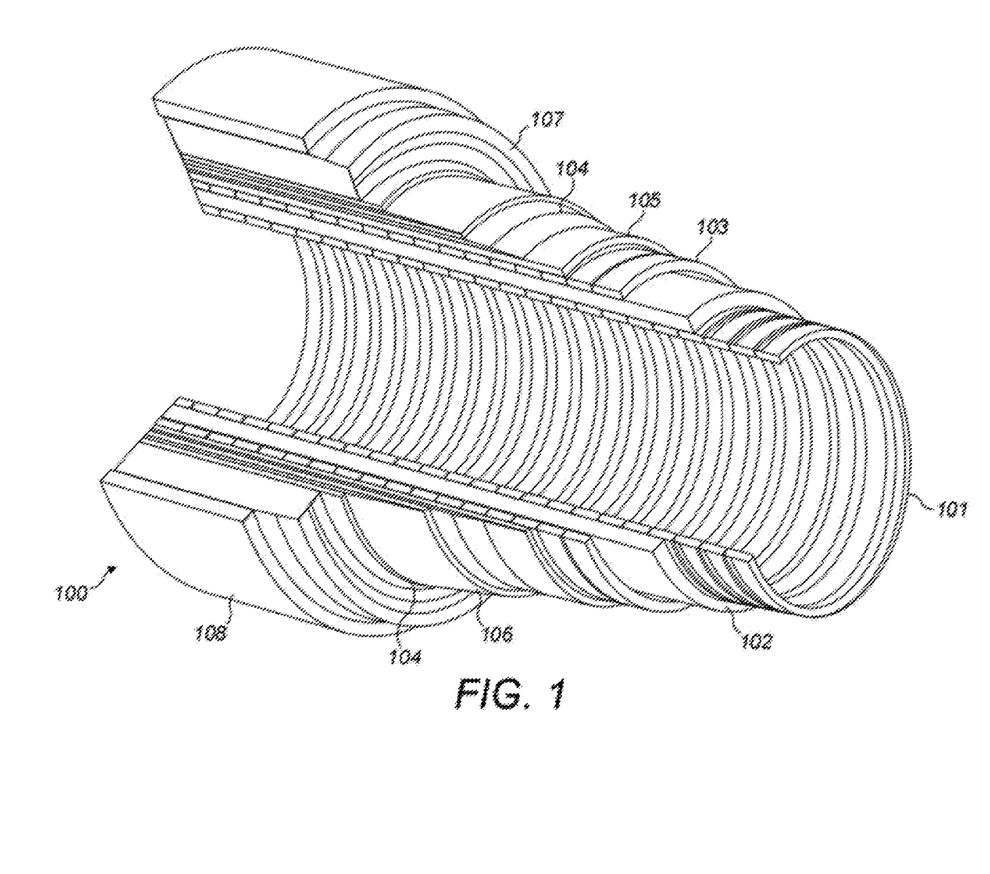
FIG. 1 illustrates a flexible pipe body.

Throughout this description, reference will be made to a flexible pipe. It will be understood that a flexible pipe is an assembly of a portion of pipe body and one or more end fittings in each of which a respective end of the pipe body is terminated. FIG. 1 illustrates how pipe body 100 is formed in accordance with an embodiment from a combination of layered materials that form a pressure-containing conduit. Although a number of particular layers are illustrated in FIG. 1, it is to be understood that the pipe body is broadly applicable to coaxial structures including two or more layers manufactured from a variety of possible materials. For example, the pipe body may be formed from polymer layers, metallic layers, composite layers, or a combination of different materials. It is to be further noted that the layer thicknesses are shown for illustrative purposes only. As used herein, the term "composite" is used to broadly refer to a material that is formed from two or more different materials.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer is often a metallic layer, formed from stainless steel, for example. The carcass layer could also be formed from composite, polymer, or other material, or a combination of materials. It will be appreciated that certain embodiments are applicable to 'smooth bore' operations (i.e. without a carcass layer) as well as such 'rough bore' applications (with a carcass layer).

The internal pressure sheath 102 acts as a fluid retaining layer and includes a polymer layer that ensures internal fluid integrity. It is to be understood that this layer may itself include a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer can also be formed from composite (optionally bonded or unbonded to surrounding layers 102, 104), polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality of metallic wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers. The tape layer may be a metal, a polymer, or composite, or a combination of materials.

The flexible pipe body also typically includes optional layers of insulation 107 and an outer sheath 108, which includes a polymer layer used to protect the pipe against penetration of seawater and other external environments, corrosion, abrasion and mechanical damage.

Each flexible pipe includes at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
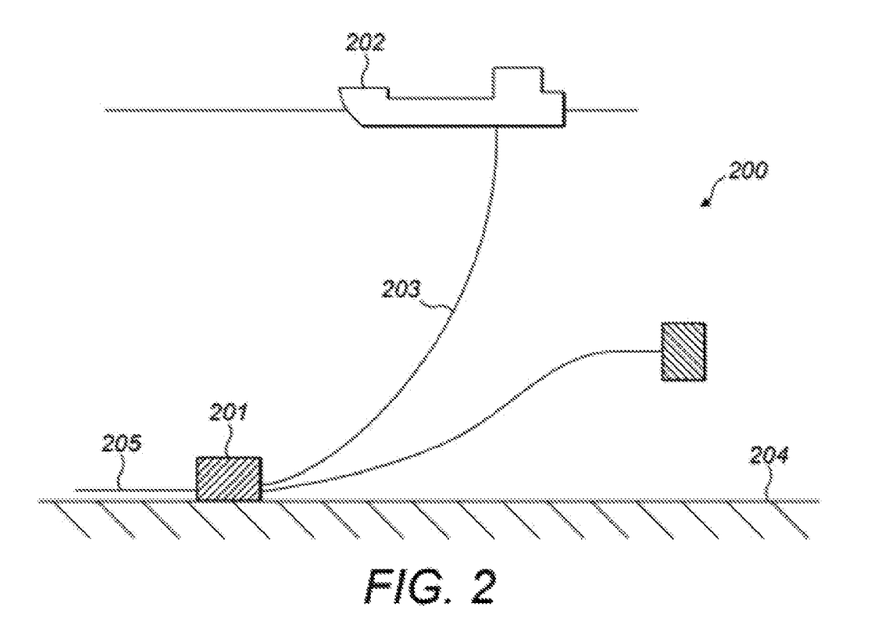
FIG. 2 illustrates a riser assembly.

FIG. 2 illustrates a riser assembly 200 suitable for transporting production fluid such as oil and/or gas and/or water from a sub-sea location 201 to a floating facility. For example, in FIG. 2 the sub-sea location 201 includes a sub-sea flow line. The flexible flow line 205 includes a flexible pipe, wholly or in part, resting on the sea floor 204 or buried below the sea floor and used in a static application. The floating facility may be provided by a platform and/or buoy or, as illustrated in FIG. 2, a ship 200. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

Figure 3:
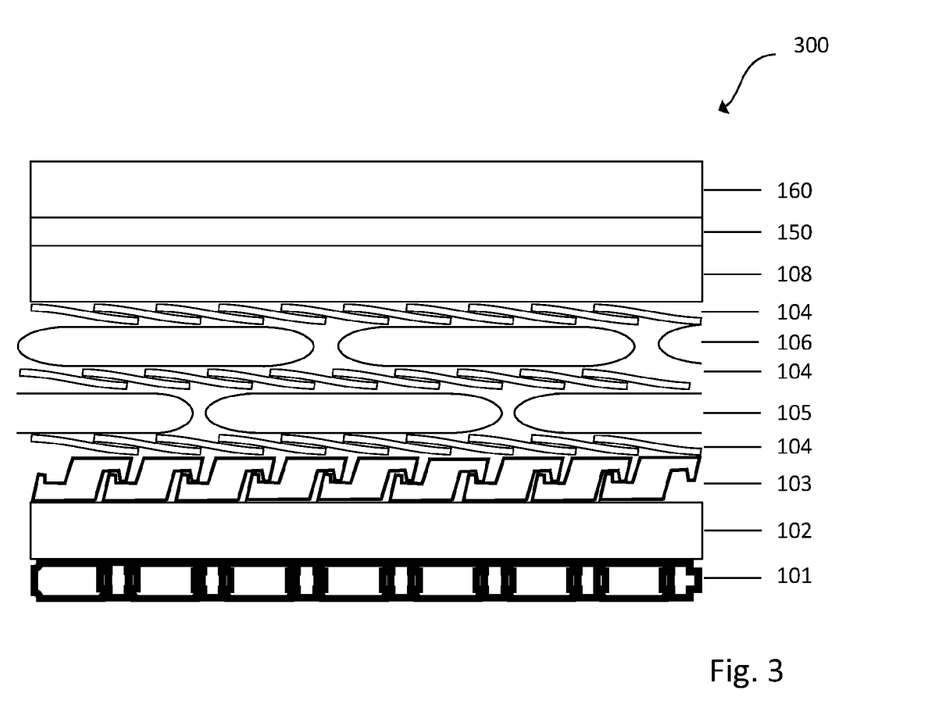
FIG. 3 illustrates a longitudinal cross-section of a flexible pipe body including an abrasion layer and a reinforcement layer.

FIG. 3 illustrates a flexible pipe body 300 for a flexible pipe for transporting production fluid from a sub-sea location. Specifically, FIG. 3 illustrates a cross section of the wall of the flexible pipe body 300 along its longitudinal axis.

The flexible pipe body 300 includes an inner sheath layer 102 for retaining fluid within a bore of the flexible pipe body 300. The flexible pipe body 300 further includes an outer sheath layer 108 provided radially outwardly of the inner sheath layer 102.

In a similar manner to known flexible pipe body 100, the flexible pipe body 300 includes a number of layers in addition to the inner and outer sheath layers. In this example, the flexible pipe body 300 includes a carcass layer 101 radially inwardly of the inner sheath layer 102. The flexible pipe body 300 further includes a pressure armour layer 103 and first and second layers of tensile armour 105 and 106 between the inner sheath layer 102 and the outer sheath layer 108. The flexible pipe body 300 further includes layers of tape 104 for helping contain underlying layers and to some extent preventing abrasion between adjacent layers. Such layers of tape are provided between the pressure armour layer 103 and the tensile armour layer 105, between both tensile armour layers 105, 106 and between the radially outermost tensile armour layer 106 and the outer sheath layer 108. Each of the layers mentioned here are optional, known layers of a flexible pipe, and may be present in many pipe variations.

The flexible pipe body 300 further includes an abrasion layer 160 provided radially outwardly of the outer sheath layer 108. The abrasion layer is suitable for protecting the outer sheath layer 108 against abrasion damage.

In this example, the abrasion layer 160 is an extruded polymer layer. It is a layer of polyamide (PA-12) material (for instance Evonik grade Vestamid LX9020). Following assembly of the remaining pipe layers (assembly of the reinforcement layer 150 onto the flexible pipe body will be discussed below), the abrasion layer 160 will be extruded directly onto the reinforcement layer.

In this example the material for the abrasion layer 160 is chosen such that the abrasion layer acts as a sacrificial layer. That is, the material of the abrasion layer is chosen such that the wear resistance of the abrasion layer is less than that of the underlying reinforcement layer 150. The selection of PA-12 for the abrasion layer matches that of the material selection for the outer sheath layer 108, ensuring that there is synergistic elastic response in each of these two layers, while the abrasion layer 160 is provided to allow for it to be worn away, at least in part, as a result of interaction with, for example, rocks on the seabed. The reinforcement layer 150 acts independently as an impact resistance layer and itself does not require any significant wear resistance, as it is protected from wear by the abrasion layer 160.

In this example, the abrasion layer 160 is sealed to prevent passage of fluids past the abrasion layer to the reinforcement layer 150. The seals are applied through known types of mechanical crimps which are made between a seal ring/gasket, the extruded polymer abrasion layer 160, and at least one component at the end connection of the flexible pipe. When the abrasion layer is sealed a venting path and/or valves may be provided to prevent a build-up of permeated gases and control their release. Such venting system is known from EP1125079B1 and/or U.S. Pat. No. 9,546,751B2.

The flexible pipe body 300 further includes a reinforcement layer 150 provided between the outer sheath layer 108 and the abrasion layer 160. The reinforcement layer is suitable for protecting the outer sheath layer 108 against impact damage. The reinforcement layer 150 is configured to help maintain integrity of the outer sheath layer 108 following impact, for example with a rocky seabed or a riser touchdown location or clash area or pipeline crossing zone or contact surface on a buoyancy element or an anchor falling or catching on the pipe.

The reinforcement layer includes a plurality of filaments 180 (as illustrated in FIGS. 4 to 12). Not all filaments 180 have been labelled in the Figures to aid clarity. In the following examples, the plurality of filaments are selected from filament strips/strands and/or fibre filaments and/or rovings and/or braids and/or belts. In this example, the plurality of filaments include aramid fibres.

The plurality of filaments may include at least one of aramid fibres, glass fibres, basalt fibres, polymer fibres (such as tensilized polyester or polypropylene), metallic or carbon filaments or filament strands. Or, the plurality of filaments may include metallic strips, for example stainless steel.

Aptly, the metallic strips have a thickness to width ratio of at least 1:5. More aptly, the metallic strips have a thickness to width ratio of at least 1:20, or more aptly of at least 1:100, for example 1:1000. In other examples, the plurality of filaments may include a combination of the different filaments listed above.

In this example, the reinforcement layer includes a woven structure of filaments. That is, the plurality of filaments 180 are arranged in a warp and weft configuration. Only the warp filaments are shown in the Figures.

The plurality of filaments are embedded in a matrix material. The matrix material may be chosen from a list of thermoplastic polymers including polyethylenes, polypropylenes, polyamides, thermoplastic elastomers (including polyesters, co-polyesters such as Dupont Hytrel®), polyphenyl sulphide (PPS), poly vinyl chlorides, poly(halogenated alkene) e.g. PVC, PVDF, PTFE, or blends of these.

FIGS. 4 to 11 illustrate examples of the reinforcement layer 150 of FIG. 3 (each shown only with the abrasion layer 160, the reinforcement layer 150 and the outer sheath layer 108; further, radially inward layers of pipe would be adjacent the outer sheath 108 on the lower side of the drawing). In these examples, the reinforcement layer 150 includes one or more windings of a reinforcement tape. In this example, the plurality of filaments are woven to form the reinforcement tape. The woven filaments are then optionally embedded in a matrix material. Some reinforcement fibre materials may require protection from the surrounding environment, for instance glass fibres can suffer damage in contact with water and therefore reduced strength over time. Aptly the use of a matrix material can ensure that the fibres remain in position in the reinforcement layer 150, providing protection to the outer sheath 108.

In the following examples, the reinforcement tape is helically wound over the outer sheath layer. The reinforcement tape is helically wound with a lay angle close to 90° from the longitudinal axis of the pipe body. Aptly, the lay angle may be between 45° and 90°. More aptly, the lay angle may be between 50° and 85°.

Figure 4:
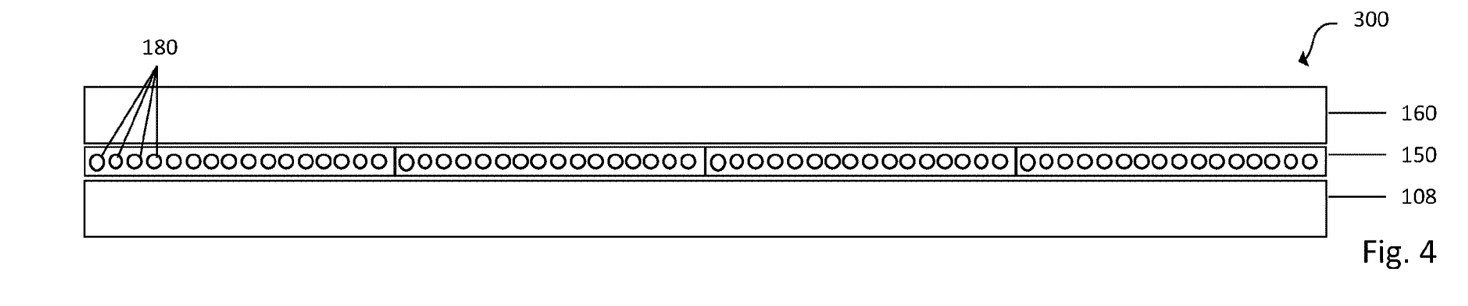
FIG. 4 illustrates an example of the reinforcement layer of FIG. 3.

In the example of FIG. 4, the windings are consecutive windings of a single reinforcement tape, wound at 80°. The reinforcement layer 150 is arranged to provide substantially 100% coverage of the outer sheath layer 108 over the length of flexible pipe body where impact and/or wear protection is required. That is, there is substantially no gap between adjacent windings of the reinforcement tape. In this example, this is achieved by winding the tape such that adjacent windings abut each other. So, there is no overlap between the adjacent windings of the reinforcement tape.

Figure 5:
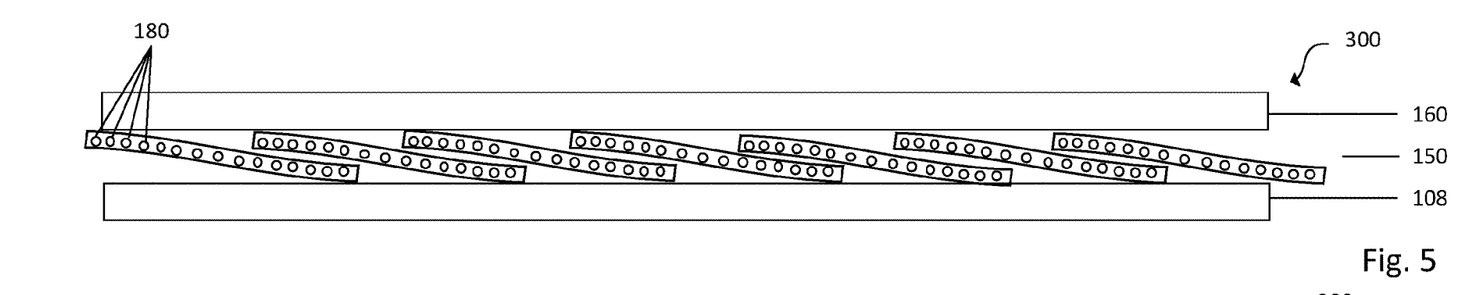
FIG. 5 illustrates another example of the reinforcement layer of FIG. 3.

FIG. 5 illustrates another example of a reinforcement layer 150. This example has some corresponding features to that of the example of FIG. 4. However, in this example adjacent windings of the reinforcement tape are arranged to overlap within the layer. That is, each winding is arranged to overlap with the preceding winding.

There may be a 10-90% overlap between adjacent windings of the reinforcement tape. That is, a first winding (wound around the circumference of the flexible pipe) will have substantially 10-90% of its exterior area covered by the successive winding (when wound around the circumference of the flexible pipe). More aptly, there is a substantially 30-60% overlap between adjacent windings of the reinforcement tape. In this example, there is around a 50% overlap between adjacent windings. The overlap helps ensure the reinforcement layers provide full coverage of the outer sheath layer 108 in the required areas, during use (during which the tape layers may move relative to each other).

Figure 6:
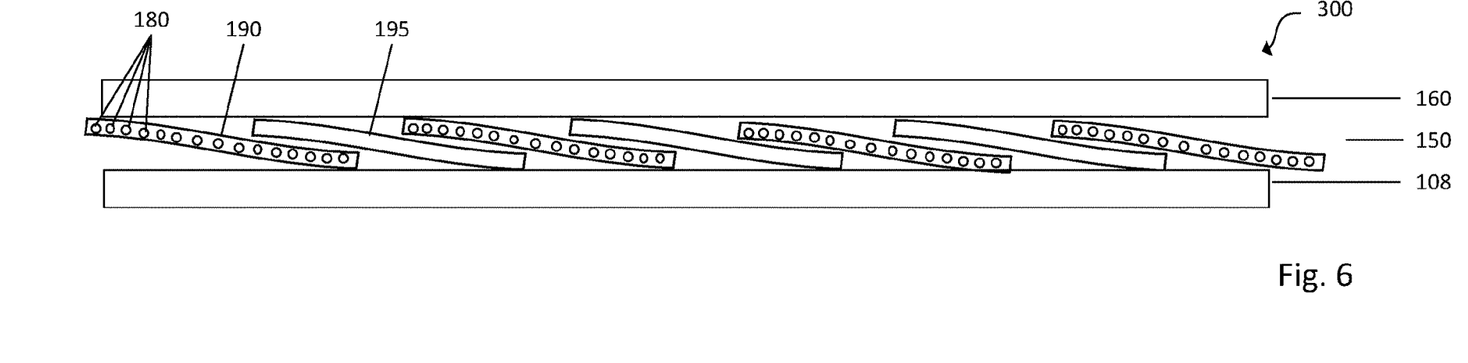
FIG. 6 illustrates another example of the reinforcement layer of FIG. 3.

FIG. 6 illustrates another example of a reinforcement layer 150. This example includes two reinforcement tapes of different types, which are alternately wound to form the reinforcement layer. The tapes overlap in the same manner as per the example of FIG. 5. In this example, a first reinforcement tape 190 include filaments as described with regards to the previous examples. The second reinforcement tape 195, in this example, does not include filaments.

In another example the reinforcement tapes may again both include filaments. In such an example, the first and second tapes may include different filaments and/or different configurations of filaments and/or different filament density and/or different matrix material. The combination of different tapes allows the designer to selectively balance cost and/or the degree of impact protection desired for a specific application.

The properties of each tape may be chosen to provide complimentary properties to improve the performance of the reinforcement layer 150 as a whole (in maintaining the integrity of the outer sheath layer 108). For example, one tape may have a higher resilience, while one tape may be harder. In a further example, the reinforcement tapes may both be of the same type.

Figure 7:
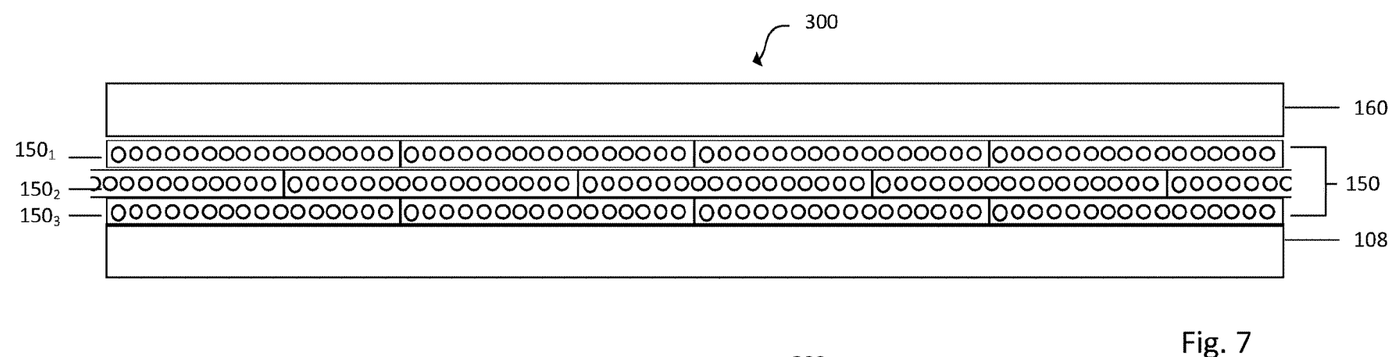
FIG. 7 illustrates another example of the reinforcement layer of FIG. 3.

FIG. 7 illustrates another example of a reinforcement layer 150. In this example, the reinforcement layer 150 includes two or more sub-layers. In this example, there are three sub-layers $150_{1\text{-}3}$. In this example, each sub-layer $150_{1\text{-}3}$ includes windings of reinforcement tape. In a similar manner to that shown in FIG. 4, there is no overlap between adjacent windings in each sub-layer. In this example, the reinforcement tape used for each sub-layer is the same.

In this example, the sub-layers are arranged such that there is an overlap between adjacent windings of adjacent sub-layers. There may be a 10-90% overlap between adjacent windings of adjacent sub-layers, here a 50% overlap. That is, a winding of a first sub-layer (around the circumference of the flexible pipe body) will be overlapped by an adjacent winding (when wound around the circumference of the flexible pipe body) of the adjacent sub-layer, such that 50% of the external area of the winding of the first sub-layer is covered. In this example the adjacent sub-layers are wound in the same circumferential direction, at substantially the same lay-angle, around the flexible pipe body but are offset from one another such that their windings overlap. There may be aptly a substantially 30-60% overlap between adjacent windings of adjacent sub-layers of the reinforcement tape. In this example, there is around a 50% overlap between adjacent windings of adjacent sub-layers. The overlap helps ensure the reinforcement layers provide full coverage of the outer sheath layer 108 in the required areas, during use. It will be understood that small gaps between consecutive wraps of tape provide the layer with some increased degree of flexibility but reduce the effective percentage overlap of subsequent (outer) sub-layers.

Figure 8:
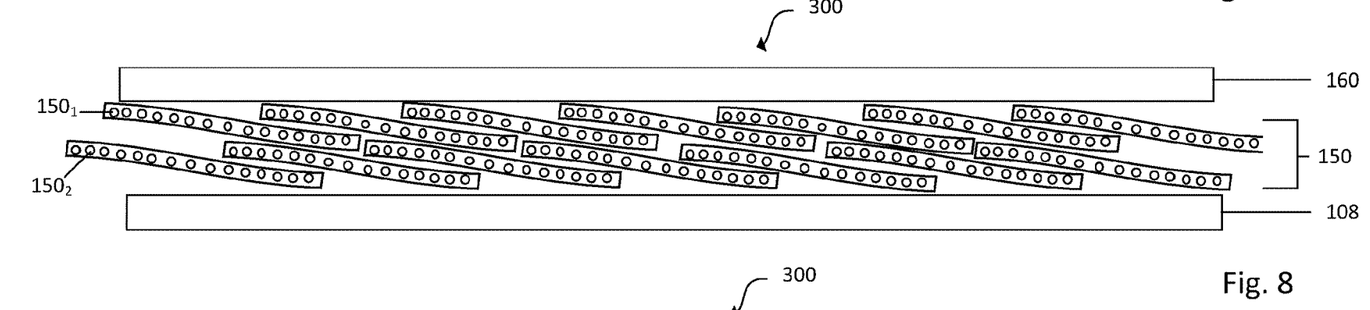
FIG. 8 illustrates another example of the reinforcement layer of FIG. 3.

FIG. 8 illustrates another example of a reinforcement layer 150. The reinforcement layer 150 of FIG. 8 includes two sub-layers $150_{1,2}$. In a similar manner to the examples of FIGS. 5 and 6, adjacent windings within each sub-layer overlap. In a similar manner to the example of FIG. 7, adjacent windings of adjacent sub-layers overlap. In this example, the reinforcement tape used for each sub-layer is the same.

Figure 9:
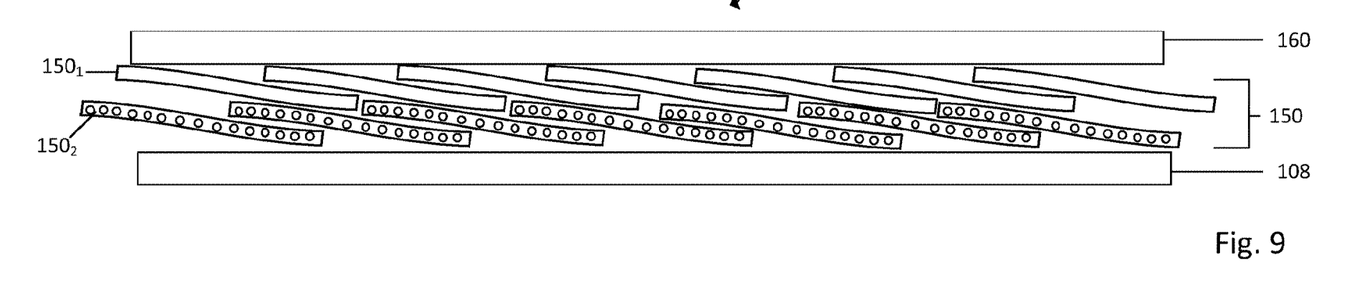
FIG. 9 illustrates another example of the reinforcement layer of FIG. 3.

FIG. 9 illustrates another example of a reinforcement layer 150. This example has some corresponding features to that of the example of FIG. 8. However in this example, the reinforcement tape used for each sub-layer is different. That is, the reinforcement layer 150 includes a first sub-layer including windings of a first reinforcement tape and a second sub-layer including windings of a second reinforcement tape. In this example the reinforcement tapes used for the first sub-layer $150_1$ and second sub-layer $150_2$ correspond to the second reinforcement tape 195 and first reinforcement tape 190 respectively. However, the tapes selected for each layer may differ in the same ways discussed above. The properties of the tape for each sub-layer may be chosen to provide complimentary properties to improve the performance of the reinforcement layer 150 as a whole. For example, one tape may have a higher resilience, while one tape may be harder.

Figure 10:
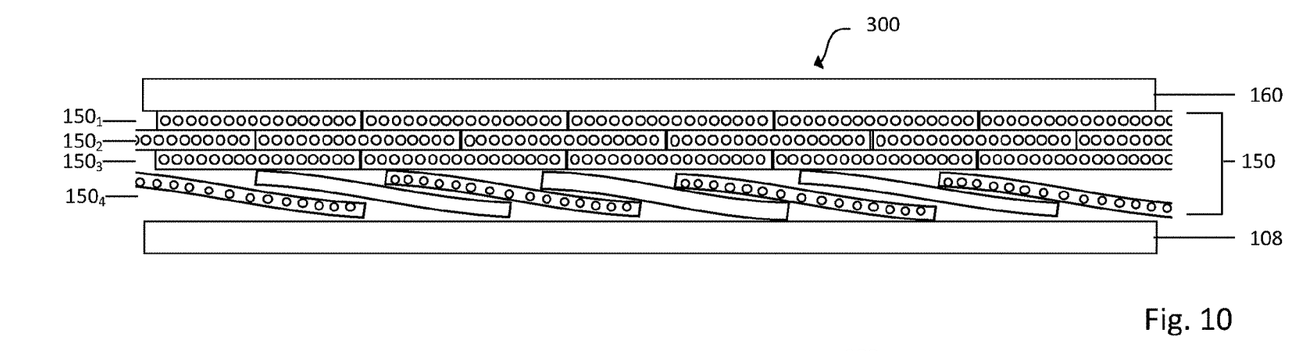
FIG. 10 illustrates another example of the reinforcement layer of FIG. 3.

FIG. 10 illustrates another example of a reinforcement layer 150. In this example, the reinforcement layer includes the combination of the reinforcement layers of FIGS. 6 and 7. That is, the reinforcement layer includes four sub-layers $150_{1\text{-}4}$. The radially inner sub-layer $150_4$ includes two reinforcement tapes of different types, which are alternately wound to form the sub-layer $150_4$. A first reinforcement tape of the sub-layer $150_4$ includes filaments as described with regards to the previous examples. The second reinforcement tape of the sub-layer $150_4$, does not include filaments. The tapes of the sub-layer $150_4$ overlap in the same manner as discussed for previous examples. The three sub-layers $150_{1\text{-}3}$ radially outwardly of the inner sub-layer $150_4$ include windings of reinforcement tape. In a similar manner to that shown in FIG. 4, there is no overlap between adjacent windings in each sub-layer. In this example, the reinforcement tape used for each sub-layer $150_{1\text{-}3}$ is the same. The sub-layers $150_{1\text{-}3}$ are arranged such that there is an overlap between adjacent windings of adjacent sub-layers. There may be a 10-90% overlap between adjacent windings of adjacent sub-layers, here a 50% overlap.

In all of the above described examples, the reinforcement layer 150, in conjunction with the outer sheath layer 108, is able to withstand at least an impact equating to 5 kJ energy without loss of integrity of the outer sheath layer 108. More aptly, the reinforcement layer 150, in conjunction with the outer sheath layer 108, is able to withstand at least an impact equating to 9.5 kJ energy without loss of integrity of the outer sheath layer 108. More aptly, the reinforcement layer 150, in conjunction with the outer sheath layer 108, is able to withstand at least an impact equating to 19 kJ energy without loss of integrity of the outer sheath layer 108. More aptly, the reinforcement layer 150, in conjunction with the outer sheath layer 108, is able to withstand at least an impact equating to 28.5 kJ energy without loss of integrity of the outer sheath layer 108. More aptly, the reinforcement layer 150, in conjunction with the outer sheath layer 108, is able to withstand at least an impact equating to 38 kJ energy without loss of integrity of the outer sheath layer 108.

The impact energy may be simulated during testing using suitable methods known in the art. For example, an impact energy of 5 kJ can be simulated using a hammer of mass 5200 kg, dropped from a height of 0.098 m at ambient temperature, with samples supported by a minimum of 500 mm depth of sand. Dropping a hammer of 4865 kg mass with an impact face of 60 mm width and edges radiused to 6 mm may allow the simulation of an impact from a trawl board shoe. Dropping the 4865 kg hammer from 0.2 m, 0.4 m, 0.6 m, or 0.8 m will simulate an impact energy of approximately 9.5 kJ, 19 kJ, 28.5 kJ and 38.0 kJ respectively.

In all of the above described examples, the outer sheath layer 108, protected by the reinforcement layer 150, is able to pass impact testing in accordance with EN 744 standard (Plastics piping and ducting systems—Thermoplastics pipes—Test method for resistance to external blows by the round-the-clock method). The addition of the abrasion layer 160 further improves the impact resistance by a small margin, despite such not being the purpose of that layer.

By configuring the flexible pipe such that the flexible pipe body corresponds to any of the above examples, a method of protecting a flexible pipe for transporting production fluid from a sub-sea location against outer sheath integrity breaching impact damage is provided.

Various modifications to the detailed arrangements as described above are possible. For example, the flexible pipe may include any suitable layers radially inwardly of the outer sheath layer. Particularly, the layers of tape 104 may be optional (in general or between specific layers), or there may be any number of tape layers 104 between layers of the flexible pipe body. There may be optional layers of insulation between layers of the flexible pipe body.

The abrasion layer 160 may be a relatively thin sleeve of wear resistant material. Aptly the abrasion layer may be polyamide or polyester. Aptly the abrasion layer may be a co-polyester, or a polypropylene that has been flexibilised. Aptly, the abrasion layer may be made from a polymer material, for instance DuPont Hytrel, which has a known good resistance to wear, or a low-cost polymer such as polypropylene or polyethylene. Such materials may be enhanced with a co-polymer or agent or mixed to improve properties of the polymer (for instance making the friction coefficient reduce to close to 0, or reducing the bending stiffness of the polymer). Aptly, the thickness of the abrasion layer may be around 0.5 to 20 mm. The use of a relatively thin sleeve of wear resistant material is foreseen as useful when the abrasion layer is connected to the end fitting of the flexible pipe body, such that axial movement between the abrasion layer and the underlying layers of the flexible pipe body is limited.

A particularly apt configuration of the pipe body has an abrasion layer and reinforcement layer matrix of the same material. For example, with an abrasion layer of Hytrel and a reinforcement layer including a Hytrel matrix with woven aramid fibres. This allows the possibility for the abrasion layer and reinforcement layer to be joined (bonded). This also allows the reinforcement layer to have improved wear resistance compared to other materials.

Figure 11:
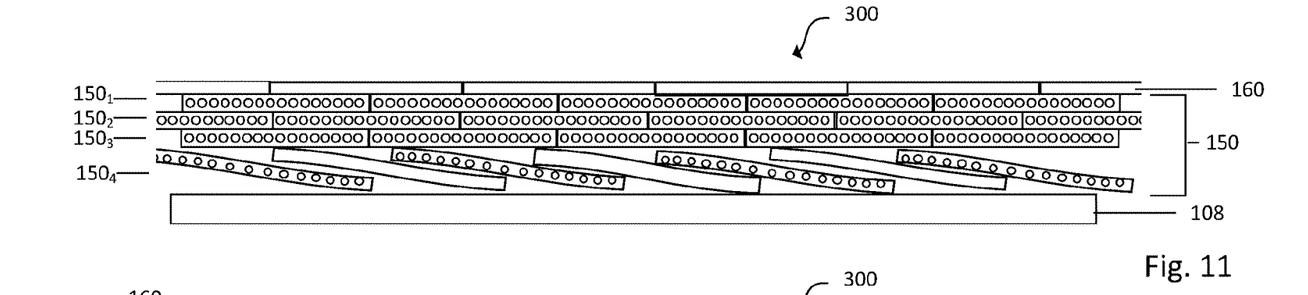
FIG. 11 illustrates another example of the abrasion layer of FIG. 3.

The abrasion layer 160 may include windings of tape. FIG. 11 illustrates an example with corresponding features to the example of FIG. 10, however the abrasion layer 160 includes windings of tape. In this example, windings of the abrasion layer are configured to overlap with adjacent windings of the reinforcement layer. There may be a substantially 60-100% overlap between windings of the abrasion layer and adjacent windings of the reinforcement layer. The materials for the tapes of the abrasion layer may include those materials previously mentioned as an extrusion layer, with the addition of materials which are less aptly extruded, such as polyurethanes these polymers present good properties for wear layers, particularly those with higher Shore D hardness (according to test standard ASTM D2240), which may provide excellent wear resistance but in thin tape form also remain sufficiently flexible to wrap around the pipe. The Shore hardness may be selected depending upon the stiffness required for the layer. This will depend upon factors such as whether the layer has a relatively small or large diameter, which affects the bend radius and stiffness required, and whether the wear layer itself is required to have relatively good wear resistance. For example, a Shore A hardness above 15 is required for smaller diameter, high bend radius, high flexibility pipe layers where a harder, stiffer material will resist bending too much, whereas Shore D above 50 is better for larger diameter pipes where the issue of bending to a tight radius is less of a concern. Aptly, where possible, the use of a polyurethane with a Shore D hardness of 60 or above is preferred.

Figure 12:
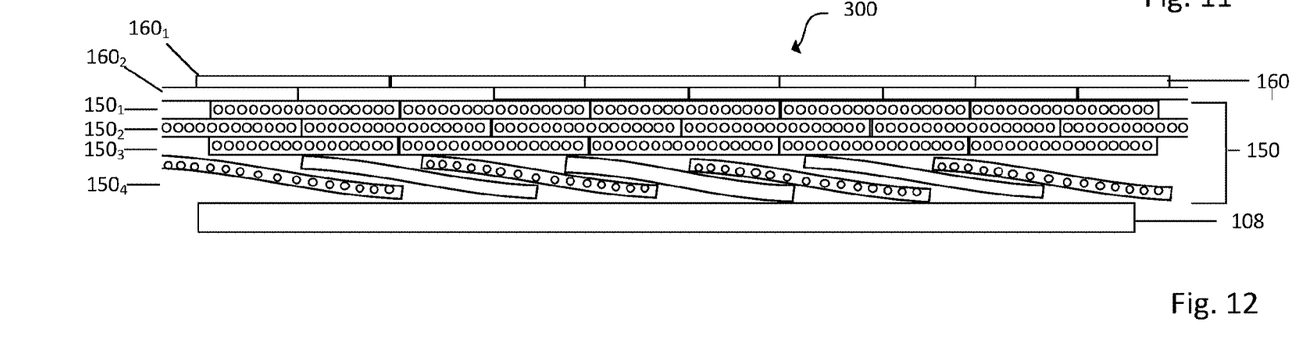
FIG. 12 illustrates another example of the abrasion layer of FIG. 3.

The abrasion layer 160 may include two or more sub-layers. FIG. 12 illustrates an example, whereby the abrasion layer 160 includes two sub-layers $160_{1,2}$. In this example, each sub-layer $160_{1,2}$ includes windings of tape. In this example, in a similar manner to the sub-layers of reinforcement layer, adjacent windings of the abrasion layer may be configured to overlap, e.g. by between 10-90%.

In another example, one or more of the sub-layers may include windings of tape and one or more sub-layers may include an abrasion layer according to any other abrasion layer disclosed herein.

In another example, the sub-layers of the abrasion layer 160 may include an innermost relatively soft material layer and an outermost wear resistant layer. This configuration may help reduce wear rates for situations when relative movement between the pipe and the contact hazard is large. The inner softer layer may include a polyurethane or a thermoplastic elastomer or a silicone rubber. The outer layer may be manufactured from fibre reinforced composite material, steel tape windings or polytetrafluorethylene (PTFE) or other suitably polymer impregnated windings of tape.

The reinforcement layer may be bonded to the abrasion layer and/or the outer sheath layer. For example, the reinforcement layer may be bonded by consolidation (melting and co-mingling) of the polymer components of the layers, or else by any suitable adhesive or resin, for example an epoxy resin, which may be cured after winding of the layers.

The reinforcement layer may include a woven or braided structure. That is, the tape/tapes of the reinforcement layer may be woven or braided around the outer sheath layer as opposed to helically wound. For example, the reinforcement layer may include a warp and weft configuration, with the warp and weft each corresponding to one or more reinforcement tapes. Alternatively, the reinforcement layer may include a plurality of reinforcement tapes braided onto outer sheath using a braiding machine.

The plurality of filaments may be woven in different ways and/or include a braided structure and/or a stranded structure and/or a knitted structure (acting rather like chain-mail armour). A key feature of these structures is that the fibres be crossed or inter-woven providing a structure that effectively acts as a barrier against impacting objects, thus protecting the outer sheath layer 108.

With the reinforcement layer described, the fibres are continuous and intertwined, and provide improved resistance to point impact loads.

The reinforcement layer 150 (or at least a sub-layer thereof) may be printed onto the surface of the outer sheath layer 108 over the desired length of pipe body which requires reinforcement layer protection.

The reinforcement tape may be manufactured from both polymer and reinforcement filaments, for instance aramid reinforcement fibres with thermoplastic elastomer fibres (e.g. Hytrel). These reinforcement tapes may optionally also be consolidated prior to wrapping to pipe, during wrapping to pipe, or after wrapping to pipe.

The matrix material of the reinforcement layer may also include a discrete rubbery phase (for example of a thermoelastic polymer), which may be incorporated via blending or co-polymerisation, to improve impact resistance.

In another example the plurality of filaments may be attached to a support material, for supporting the filaments thereon, for example a polymeric material as discussed above. The filaments may be attached via an adhesive.

One or more of the sub-layers of the reinforcement tape may be a composite layer, including one or more of the composite materials described previously.

In the examples described above, the sub-layers are unbonded. However, one or more of the sub-layers may be bonded to an adjacent sub-layer using any suitable adhesive or consolidated prior to wrapping to pipe, during wrapping to pipe, or after wrapping to pipe.

The at least two sub-layers of the reinforcement layer may be helically wound at approximately opposing helical angles with respect to the axis of the flexible pipe body.

The reinforcement layer may be a composite layer with a thermoplastic matrix. Or, the reinforcement layer may be a composite layer with a thermoset matrix, e.g. including an epoxy material. In this case, the layer may be applied to the pipe body as discrete wound tapes. This will help ensure flexibility of the pipe body. Alternatively, the reinforcement layer may include a fabric tape layer sandwiched between two thermoset matrix layers.

The flexible pipe body may further include a fluid detection system located between the outer sheath layer 108 and the abrasion layer 160. The fluid detection system may include a low power electrical breach detection system, or a fibreoptic breach detection system. The breach system may/may not be integral with the reinforcement layer.

The flexible pipe body may include a venting system, for venting gases from between the outer sheath layer and the abrasion layer. The venting system may include a valve member, incorporated into an end fitting of the flexible pipe. Alternatively (or in addition), the venting system may include at least one passageway installed within the reinforcement layer providing a path along which fluid may proceed to a valve member through which it may be released to the surrounding environment in a controlled manner.

With the above-described arrangement the reinforcement layer is configured to act like a 'bullet-proof vest' to avoid or reduce the likelihood of damage to the outer sheath layer. In addition it is itself protected from wear damage by the abrasion layer, thus the two layers work synergistically to protect the pipe.

The inclusion of filaments within the reinforcement layer allows the reinforcement member to absorb impact energy, without over-stiffening the flexible pipe.

The configurations described above, provide the reinforcement layer with strength in a plurality of axes, which helps ensure impact resistance is provided regardless of the conditions of the impact (e.g. the direction from which the contact impact hazard impacts the flexible pipe body).

It will be clear to a person skilled in the art that features described in relation to any of the embodiments described above can be applicable interchangeably between the different embodiments. The embodiments described above are examples to illustrate various features of the invention. In particular, any example of an abrasion layer disclosed herein may be provided in combination with any reinforcement layer disclosed herein.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A flexible pipe body comprising:
   an inner sheath layer configured for retaining fluid within a bore of a flexible pipe body;
   an outer sheath layer provided radially outwardly of the inner sheath layer;
   a pressure armour layer and first and second tensile armour layers, each between the inner sheath layer and the outer sheath layer;
   an abrasion layer provided radially outwardly of the outer sheath layer configured for protecting the outer sheath layer against abrasion damage; and
   a reinforcement layer provided between the outer sheath layer and the abrasion layer, configured for protecting the outer sheath layer against impact damage;
   wherein the reinforcement layer comprises intertwined filaments selected from the group consisting of woven, braided, knitted and otherwise intertwined; and
   wherein the filaments are embedded in a matrix material.

2. The flexible pipe body according to claim 1, wherein the filaments are attached to a support material.

3. The flexible pipe body according to claim 1, wherein the filaments comprise at least one of aramid fibres, glass fibres, basalt, tensilized polymer, metallic and carbon filaments.

4. The flexible pipe body according to claim 1, wherein the filaments are arranged in a warp and weft configuration.

5. The flexible pipe body according to claim 1, wherein the reinforcement layer comprises one or more windings of a reinforcement tape.

6. The flexible pipe body according to claim 5, wherein there is a substantially 10-90% overlap between adjacent windings of the reinforcement tape.

7. The flexible pipe body according to claim 5, wherein the filaments form the reinforcement tape.

8. The flexible pipe body according to claim 1, wherein the reinforcement layer includes two or more sub-layers.

9. The flexible pipe body according to claim 8, wherein at least one of the two or more sub-layers is a composite layer.

10. The flexible pipe body according to claim 8, wherein at least two of the two or more sub-layers are unbonded.

11. The flexible pipe body according to claim 8, wherein at least two of the two or more sub-layers comprise windings of reinforcement tape.

12. The flexible pipe body according to claim 11, wherein the at least two sub-layers are helically wound at approximately opposing helical angles with respect to a longitudinal axis of the flexible pipe body.

13. The flexible pipe body according to claim 11, wherein there is a substantially 10-90% overlap between adjacent windings of adjacent sub-layers.

14. The flexible pipe body according to claim 1, wherein the reinforcement layer provides substantially 100% coverage of the outer sheath layer over the length of flexible pipe body.

15. The flexible pipe body according to claim 1, wherein the reinforcement layer, in conjunction with the outer sheath layer, is configured to withstand an impact equating to at least 5 kJ energy without loss of integrity of the outer sheath layer.

16. The flexible pipe body according to claim 1, wherein the reinforcement layer, in conjunction with the outer sheath layer, is configured to pass impact testing in accordance with EN 744 standard.

17. The flexible pipe body according to claim 1, wherein the reinforcement layer is bonded to one or both the abrasion layer and the outer sheath layer.

18. The flexible pipe body according to claim 1, wherein the abrasion layer comprises windings selected from the group consisting of tape, an extruded polymer layer, and an outer sheath protection system.

19. The flexible pipe body according to claim 1, wherein the abrasion layer is sealed.

20. The flexible pipe body according to claim 19 further comprising a fluid detection system located between the outer sheath layer and the abrasion layer.

21. The flexible pipe body according to claim 20, wherein the fluid detection system comprises one of a low power electrical breach detection system, and a fibre optic breach detection system.

22. The flexible pipe body according to claim 20, wherein the fluid detection system comprises a low power electrical breach detection system integral with the reinforcement layer.

23. A flexible pipe body comprising:
an inner sheath layer configured for retaining fluid within a bore of a flexible pipe body;
an outer sheath layer provided radially outwardly of the inner sheath layer;
an abrasion layer provided radially outwardly of the outer sheath layer configured for protecting the outer sheath layer against abrasion damage;
a venting system, configured for venting gases from between the outer sheath layer and the abrasion layer; and
a reinforcement layer provided between the outer sheath layer and the abrasion layer, configured for protecting the outer sheath layer against impact damage;
wherein the reinforcement layer comprises intertwined filaments selected from the group consisting of woven, braided, knitted and otherwise intertwined.

24. The flexible pipe body according to claim 23, wherein the venting system includes a valve member, incorporated into an end fitting of the flexible pipe.

25. A method comprising:
protecting a flexible pipe for transporting production fluid from a sub-sea location against outer sheath integrity breaching impact damage; and
wherein the flexible pipe comprises the flexible pipe body according to claim 1.

* * * * *